United States Patent
Fayolle et al.

[11] Patent Number: 5,819,505
[45] Date of Patent: Oct. 13, 1998

[54] PROCESS FOR CONTINUOUS ABHERENT TREATMENT OF A SURFACE ADHERENT HOLT-MELT ADHESIVE

[75] Inventors: Jean Fayolle, Igny; Daniel Grandin, Villiers Le Chateau; Heinrich Niethen, Plaisir; Michel Pierron, Saint Memmie; Jean-Louis Prevot, Hautvillers, all of France

[73] Assignees: Henkel France, France; Henkel Kommanditgesellschaft Auf Aktien, Germany

[21] Appl. No.: 628,083

[22] Filed: Apr. 8, 1996

Related U.S. Application Data

[63] Continuation of Ser. No. 545,596, Oct. 22, 1995, abandoned.

[30] Foreign Application Priority Data

Apr. 22, 1993 [FR] France .................................. 93 04762
Apr. 20, 1994 [WO] WIPO ...................... PCT/FR94/00443

[51] Int. Cl.⁶ .................................................. B65B 63/08
[52] U.S. Cl. .............................. 53/440; 53/428; 53/429; 53/435
[58] Field of Search ........................... 198/952; 264/255; 53/116, 117, 122, 127, 428, 429, 435, 440, 513, 520, 522

[56] References Cited

U.S. PATENT DOCUMENTS

| | | |
|---|---|---|
| 2,931,148 | 4/1960 | Smith . |
| 3,851,438 | 12/1974 | Prisman .................. 53/440 X |
| 3,987,602 | 10/1976 | Stahl ......................... 53/440 |
| 4,028,458 | 6/1977 | Wallace . |
| 4,054,632 | 10/1977 | Franke . |
| 4,088,727 | 5/1978 | Elliott . |
| 4,137,692 | 2/1979 | Levy ........................... 53/440 |
| 4,247,502 | 1/1981 | Loechell . |
| 4,450,962 | 5/1984 | Matthews et al. ...... 53/440 X |
| 4,459,254 | 7/1984 | Zuber . |
| 4,748,796 | 6/1988 | Viel ....................... 53/440 X |
| 4,755,245 | 7/1988 | Viel . |
| 5,112,552 | 5/1992 | Wittman et al. . |
| 5,160,686 | 11/1992 | Thaler et al. . |
| 5,257,491 | 11/1993 | Rouyer et al. ......... 53/440 X |
| 5,292,468 | 3/1994 | Colombani . |
| 5,333,439 | 8/1994 | Bozich et al. .......... 53/440 X |
| 5,373,682 | 12/1994 | Hatfield et al. ............ 53/440 |
| 5,401,455 | 3/1995 | Hatfield et al. ........ 53/127 X |
| 5,669,207 | 9/1997 | Hull ............................ 53/440 |
| 5,715,654 | 2/1998 | Taylor et al. .............. 53/440 |

FOREIGN PATENT DOCUMENTS

| | | |
|---|---|---|
| 0258086 | 3/1988 | European Pat. Off. . |
| 0412867 | 2/1991 | European Pat. Off. . |
| 0452186 | 10/1991 | European Pat. Off. . |
| 0469564 | 2/1992 | European Pat. Off. . |
| 1019808 | 2/1966 | United Kingdom . |

*Primary Examiner*—Daniel Moon
*Attorney, Agent, or Firm*—Jones & Askew

[57] ABSTRACT

Continuous anti-adherent treatment process for a surface-tacking thermofusible adhesive, characterized in that a carrier belt (1) is continuously displaced in translation, the upper surface thereof being cooled by its lower face, said surface being covered by a layer (3) of an anti-adherent protection product, the thermofusible adhesive (4) to be treated being deposited on the protection product layer. The assembly (7) comprising of the adhesive (4) and the layer (3) of protection product is folded back on itself so as to release a composite material (8) consisting of a double thickness (4, 4') of thermofusible adhesive sandwiched between two layers (9, 9') of anti-adherent protection product (3) and the composite material is cut into fragments.

7 Claims, 2 Drawing Sheets

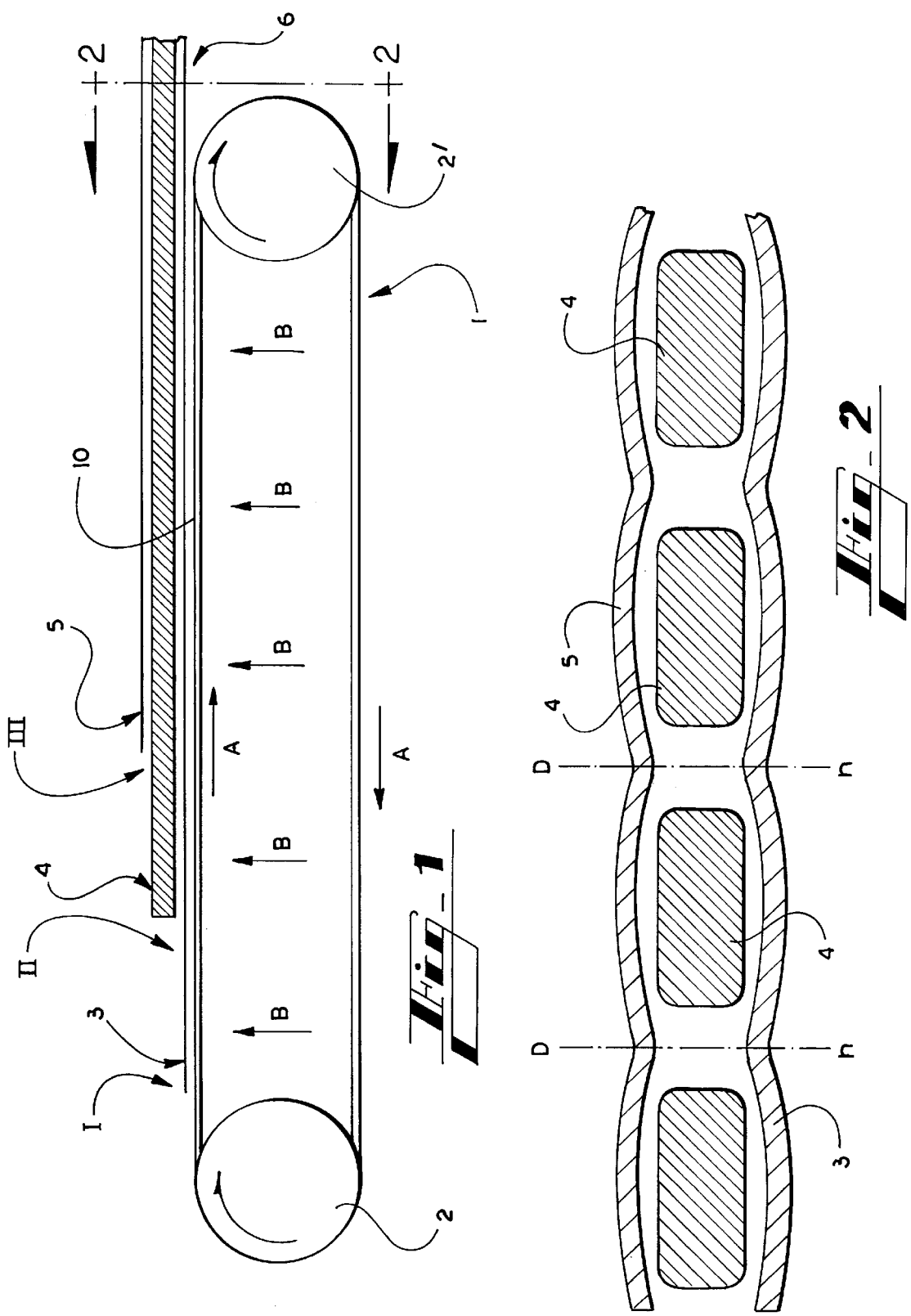

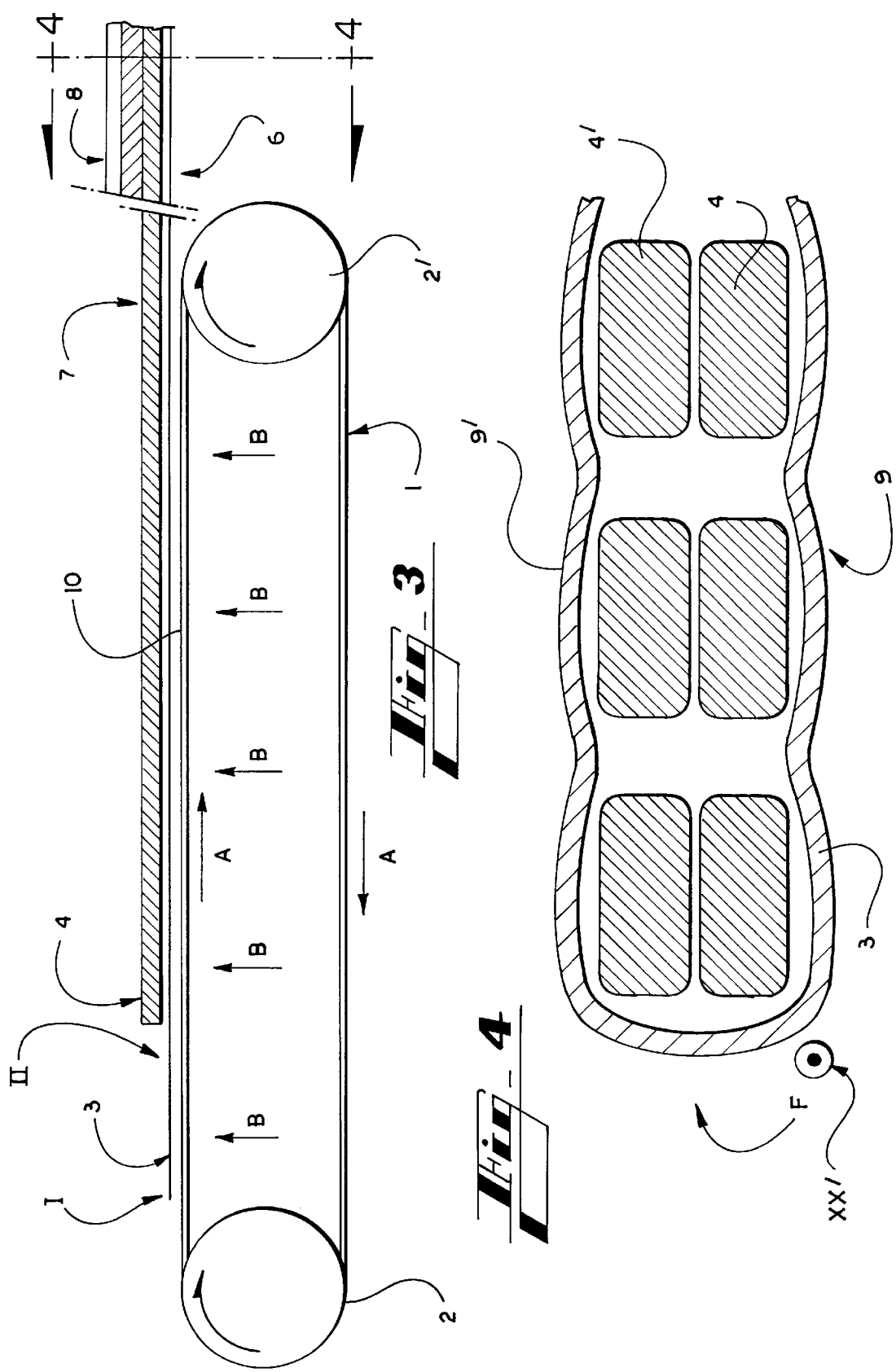

PROCESS FOR CONTINUOUS ABHERENT TREATMENT OF A SURFACE ADHERENT HOLT-MELT ADHESIVE

CROSS-REFERENCE TO RELATED APPLICATION

This is a continuation of U.S. application Ser. No. 08/545,596 now abandoned, submitted on Oct. 22, 1995 to enter the national phase in the U.S. of International Application No. PCT/FR94/00443 with an international filing date of Apr. 20, 1994.

FIELD OF THE INVENTION

The present intention relates to a process for continuous adherent treatment of a surface-adherent hot-melt adhesive.

BACKGROUND OF INVENTION

In many fields of industrial chemistry, it is commonplace to employ surface-adherent hot-melt adhesive substances, that is to say materials which, at the handling temperature, generally the ambient temperature, are characterized by one or more of the following criteria:
  intrinsic adhesiveness of the substance,
  surface adhesiveness in standard temperature and pressure conditions,
  sensitivity to pressure,
  increase in the surface adhesiveness with an increase in temperature (for example in summer).

By way of a non exhaustive example, these products can be used in the manufacture of articles of hygiene (disposable nappies, articles of feminine hygiene), of adhesive-backed Moquettes and coatings, of self-adhesive threshold battens, of adhesive-backed envelopes and labels, or else in the securing or adhesive bonding of various supports in direct application.

Bearing in mind the permanent adhesive nature of these materials, it is essential that they are subjected to an adherent treatment to allow them to be handled, transported and stored more easily.

In addition, this treatment makes it possible to avoid agglomeration of a number of fragments of these materials and the deposition of impurities on the latter.

To this end the surface-adherent hot-melt adhesives are conventionally delivered in wax-treated or silicone-treated tubs, which enables any adhesion to be avoided; however, this packaging method is particularly costly and not very practical, given that the tubs generally have a capacity of between 500 g and 5 kg and that not infrequently users must daily "demold" a large quantity that can reach several tons.

To overcome these disadvantages it has already been proposed to subject hot-melt adhesives to various treatments enabling them to lose their surface adhesiveness and consequently to be packaged directly in bulk.

For example, it has already been proposed to coextrude a sheath surrounding the hot-melt product; the coextrusion material may be, for example, polyethylene or a "hot melt" which is not self-adhesive and is compatible with the formulation of the extruded product.

It has also been proposed to protect adhesive materials by electrostatic deposition of a fine layer of pulverulent adherent agent in a would in which the adhesive is east.

A process has also been proposed for spraying a "hot melt" which is not self-adherent, contained in a would.

However, these various treatment processes have the disadvantage of being costly, not very practical and often difficult to put into continuous practice.

Independently of the above, document EP-A-0 141 087 discloses a process for noncontinuous adhesive treatment of an elastomer intended at the end of treatment to undergo a vulcanization process as a result of which it loses all adhesive nature. However, such an elastomer is an intermediate product which is fundamentally different from a surface-adherent hot-melt adhesive which is intended to be marketed as such.

Document EP-A-0 412 867 also discloses a process for continuous adherent treatment of a surface-adherent hot-melt adhesive, by means of which a coating of an adherent agent compatible with the hot-melt adhesive and entailing no significant physicochemical modifications of the latter, is applied to at least a portion of the surface of a lace of this adhesive, emerging continuously from an extruder exchanger or from a die, at a temperature above its softening temperature, the lace thus coated is cooled and is then cut to the desired length and the fractions thus obtained are packaged directly with a view to their marketing as finished products without taking any additional precautions.

Despite its advantages, this process has been found to be difficult to control when used.

SUMMARY OF INVENTION

The objective of the present invention is to overcome the above-mentioned disadvantages by proposing a new process for continuous adherent treatment of a surface-adherent hot-melt adhesive.

In accordance with the invention this process is characterized in that:
  a conveyor belt provided with a smooth and adherent upper surface is moved continuously in translation,
  this surface is cooled via its lower face,
  this surface is covered, starting at a covering station, with a layer of adherent protective product compatible with the hot-melt adhesive to be treated and entailing no significant physicochemical modification of the latter,
  starting at a deposition station situated downstream of the covering station in the direction of travel of the conveyor belt, the hot-melt adhesive to be treated, emerging continuously from an extruder mixer or from a die, is deposited onto the layer of protective product by free casting or under pressure,
  the combination consisting of the adhesive and the layer of adherent protective product is folded back onto itself around its median lengthwise axis so as to release a composite material consisting of a double thickness of hot-melt adhesive sandwiched between two layers of adherent protective product, and
  this composite material is cut into fragments, which are packaged directly without taking any additional precaution.

It should be noted that the stage of folding back onto itself the combination consisting of the adhesive and the layer of adherent protective product can be performed either at the end of the conveyor belt while the composite material is spread out horizontally, or further downstream and while the composite material is directed obliquely or vertically, especially after having passed over rollers for changing direction.

This stage of folding corresponds to an essential stage of the invention, since it offers the advantage of requiring a lesser quantity of adherent protective product and of making it possible to obtain a double thickness of adhesive.

It is essential in all cases, of course, that the layer of adherent protective product should be continuous and sufficiently thick for the hot-melt adhesive, which is cast at elevated temperature, not to run the risk of adhering to the upper surface of the conveyor belt.

In accordance with the invention this surface may be made of any smooth and adherent material such as, for example, stainless steel or Teflon.

According to a preferential characteristic of the invention, the conveyor belt employed is the upper part of an essentially rigid plate closed back onto itself forming a loop and driven continuously in rotation around two rotary rolls.

The use of such a loop has in fact been found particularly practical in use.

According to another preferential characteristic of the invention, starting at the deposition station, essentially parallel bands of the hot-melt adhesive to be treated are deposited onto the layer of adherent protective product 80 as to release, especially at the end of the conveyor belt, a composite material consisting of a double thickness of bands of hot-melt adhesive sandwiched between two layers of adherent protective product, and this composite material is sectioned into ribbons by essentially parallel lengthwise cuts situated between the bands of hot-melt adhesive.

This is a particularly advantageous characteristic of the invention, bearing in mind the fact that it is thus possible not to foul the cutting tool during this lengthwise sectioning.

It should be noted that, in accordance with the invention, care should be taken to deposit onto the layer of adherent protective product an even number of bands of hot-melt adhesive in order that the median lengthwise axis around which the operation of folding is performed is situated between two bands and not in the middle of one of the latter.

After the above-mentioned sectioning the ribbons must be sectioned again perpendicularly 80 as to make it possible to obtain fragments which are essentially of rectangular shape.

To this end, and according to another characteristic of the invention, the ribbons are sectioned while compressing the sectioning surface 80 that its edges adhere to one another.

This "folding down" of the sectioning "lips" against one another, which corresponds to a characteristic that is known per se, makes it possible to eliminate any sectioning surface that is not coated with adherent protective product and therefore to package, without any preliminary protection, the fragments which have been cut without any risk of agglomeration at the cut sections.

Means which are known per se may be employed for performing this second sectioning, such as, for example, cutters with blades coated with adherent product, bladed wheels or other cutters, especially with a guillotine.

The invention permits, of course, the treatment of any surface-adherent hot-melt adhesives; the compounds listed below may be mentioned, by way of example, among the substances that can be treated:

formulations based on EVA, on styrene-butadiene-styrene (SBS) and styrene-isoprene-styrene (SIS) copolymers, formulations based on resins and derivatives (for example rosin, coumarone, indene and aliphatic and aromatic hydrocarbon resins), formulations based on styrene-ethylene-butylene (SEB) and styrene-ethylene-butylene-styrene (SsBS) copolymers, formulations based on polyesters or polyamides, more generally, any formulations produced by the combination of the above-mentioned polymers or copolymers, polyeondensates and copolyeondensates.

According to another particularly advantageous characteristic of the invention, starting at the covering station, a hot-melt adhesive which is not surface adherent is spread in the molten state over the upper surface of the conveyor belt.

This operation may be performed by any means, in particular by spraying, by curtain-casting from a slot, according to a process which is employed conventionally, especially in the field of varnishing, or else by making use of applicator rolls.

Such an operation, which is equivalent to manufacturing in situ an adherent protective film which solidifies immediately on the cooled upper surface of the conveyor belt, offers the advantage of making it possible to choose the protective hot-melt adhesive from a wide variety of possible products and therefore to adapt the latter precisely to the characteristics of the product to be protected.

Another possibility in accordance with the invention consists in replacing the film of hot-melt adhesive which is not surface-adherent, formed in situ on the actual surface of the conveyor belt, with a prefabricated film of adherent polymer that is compatible with the hot-melt adhesive to be treated, which is unwound onto the upper surface of the belt starting at the Covering station.

Although being preferential, these two alternative forms of the invention must not be considered as limiting the invention in any way, and the covering of the upper surface of the conveyor belt with a protective layer could be performed differently.

By way of example and more conventionally, it is possible to envisage "dusting" this surface with an adherent powder, especially of one of the products mentioned in document EP-A-0 412 867 (metal esters chosen especially from the group consisting of calcium, barium, aluminum and/or zinc, etc., stearates, octoates, ethylhexanoates and oleates).

However, when compared with the above-mentioned two alternative forms, such a process has the disadvantage of not allowing an equally precise adaptation of the characteristics of the protective product employed to those of the hot-melt adhesive to be treated.

BRIEF DESCRIPTION OF DRAWINGS

The characteristics of the process which forms the subject of the invention will be described in greater detail with reference to the attached drawings, in which:

FIGS. 1 and 3 are diagrammatic lengthwise sections of a plant allowing the process in accordance with the invention to be put into practice, FIGS. 2 and 4 are 8 diagrammatic sections of the composite material released at the end of the conveyor belt, through a plane shown diagrammatically by the double arrow 2—2 in FIG. 1 and 4—4 in FIG. 3.

DETAILED DESCRIPTION OF PREFERRED EMBODIMENT

According to FIG. 1 the process is put into practice at the upper surface 10 of an essentially rigid plate 1 closed back onto itself forming a loop and driven in rotation following the arrows A around two rotary rolls 2 and 2'.

The upper surface 10 is continuously cooled via its lower face by cooling means shown diagrammatically by arrows B and acts as a conveyor belt for ensuring the continuous movement of the hot-melt adhesive in line with a succession of treatment stations.

In accordance with the invention, in a first stage, the upper surface 10 of the plate 1 is covered starting at a covering station, shown diagrammatically by the arrow I, with a continuous layer 3 of an adherent protective product compatible with the hot-melt adhesive and entailing no significant physicochemical modifications of the latter.

As already indicated, and without limiting the invention, this operation of covering may correspond to the application of a hot-melt adhesive that is not surface-adherent and is either spread in the molten state by spraying, curtain-casting or with the aid of coating rolls, with immediate cooling on coming into contact with the cooled surface, or in the form of a prefabricated film unwound onto the surface 10 or else by "dusting" with a powder applied in a thickness that is sufficient not to run the risk of being subsequently passed through by the adhesive to be treated.

After application of the layer 3, essentially parallel bands 4 of the hot-melt adhesive to be treated are deposited continuously onto the latter, directly as it emerges from the die, by free casting or under pressure, starting at a deposition station shown diagrammatically by the arrow II.

Next, in a third stage, the combination consisting of the adhesive 4 and the layer 3 is folded back onto itself following the arrow F around its median lengthwise axis shown diagrammatically by the axis x–x' in FIG. 4.

At the end 6 of the surface 10 it is thus possible to release a composite material 8.

According to FIG. 3, this composite material 8 consists of a double thickness of band 4, 4' sandwiched between two layers 9, 9' of the adherent protective product constituting the initial layer 3. This release is greatly facilitated by the cooling of the surface 10 and by its smooth nature.

According to FIG. 3, it is clear that, from the composite material 8, it is possible to obtain ribbons of hot-melt adhesive which are protected by cutting along lengthwise planes shown diagrammatically by the axes E—E situated between the different bands 4, 4'. Such a sectioning offers the advantage of not presenting any risk of fouling of the knives employed for the cutting.

The ribbons thus obtained must next be sectioned again perpendicularly to the planes E—E so as to obtain blocks which can be marketed directly as finished products.

To this end, and in a way which is not shown in the drawings, means which are known per se can be employed, such as, for example, cutters with blades coated with adherent product, beaded wheels or other cutters, especially with a guillotine.

We claim:

1. Process for continuous abherent treatment of a surface-adherent hot-melt adhesive, characterized in that:

a conveyor belt (1) provided with a smooth and abherent upper surface (10) is moved continuously in translation, this surface is cooled via its lower face, this surface is covered, starting at a covering station (I), with a layer (3) of abherent protective product compatible with the hot-melt adhesive to be treated and entailing no significant physicochemical modification of the latter, starting at a deposition station (II) situated downstream of the covering station (I) in the direction of travel (A) of the conveyor belt (1), the hot-melt adhesive (4) to be treated, emerging continuously from an extruder mixer or from a die, is deposited onto the layer (3) of protective product by free casting or under pressure, the combination (7) consisting of the adhesive (4) and the layer (3) of abherent protective product is folded back onto itself around its median lengthwise axis (xx') 50 as to release a composite material (8) consisting of a double thickness (4,4') of hot-melt adhesive sandwiched between two layers (9,9') of abherent protective product (3), and this composite material is cut into fragments, which are packaged directly without taking any additional precaution.

2. Process according to claim 1, characterized in that the conveyor belt employed is the upper part of an essentially rigid plate (1) closed back onto itself forming a loop and driven continuously in rotation around two rotary rolls (2, 2g).

3. Process according to claim 1, characterized in that, starting at the deposition station (II), essentially parallel bands (4) of the hot-melt adhesive to be treated are deposited onto the layer (3) of abherent protective product so as to release a composite material (7) consisting of a double thickness of bands of hot-melt adhesive (4, 4') sandwiched between two layers (9, 9') of abherent protective product (3), and this composite material is sectioned into ribbons by essentially parallel lengthwise cuts situated between the bands of hot-melt adhesive so as not to foul a cutting tool or knife, during this sectioning.

4. Process according to claim 3, characterized in that the ribbons (4, 4') are sectioned in a way known per se while compressing a sectioning surface 50 that its edges adhere to one another, thus making it possible to obtain fragments coated with abherent protective product (3) over the whole of their surface.

5. Process according to claim 1, characterized in that the hot-melt adhesive belongs to the group consisting of hot-melt adhesives based on EVA, on styrene-butadiene-styrene (SBS) and styrene-isoprene-styrene (SIS) copolymers, on synthetic elastomers, on resins of derivatives of styrene-ethylene-butylene (SEB) and/or styrene-ethylene-butylene-styrene (SEBS) copolymers, on polyesters and on polyamides, and of any combinations of these polymers or copolymers.

6. Process according to claim 1, characterized in that, starting at the covering station (I), a hot-melt adhesive (3) which is not surface-adherent is spread in the molten state over the upper surface (10) of the conveyor belt (1).

7. Process according to claim 1, characterized in that, starting at the covering station (I), a prefabricated film (3) of nonadherent polymer that is compatible with the hot-melt adhesive to be treated is unwound onto the upper surface (10) of the conveyor belt (1).

* * * * *